United States Patent
Tan (10) Patent No.: US 7,991,285 B2
(45) Date of Patent: Aug. 2, 2011

(54) USING A CAPTURED BACKGROUND IMAGE FOR TAKING A PHOTOGRAPH

(75) Inventor: Kally Shi Yi Tan, Arlov (SE)

(73) Assignee: Sony Ericsson Mobile Communications AB, Lund (SE)

(*) Notice: Subject to any disclaimer, the term of this patent is extended or adjusted under 35 U.S.C. 154(b) by 165 days.

(21) Appl. No.: 11/970,617

(22) Filed: Jan. 8, 2008

(65) Prior Publication Data
US 2009/0175609 A1    Jul. 9, 2009

(51) Int. Cl.
G03B 41/00    (2006.01)
H04N 5/262    (2006.01)

(52) U.S. Cl. .......................... 396/322; 348/239

(58) Field of Classification Search .................. 396/322, 396/323, 334, 335, 310; 348/239, 231.99; 382/190–195
See application file for complete search history.

(56) References Cited

U.S. PATENT DOCUMENTS

| | | | |
|---|---|---|---|
| 6,657,661 B1 * | 12/2003 | Cazier | 348/231.2 |
| 2002/0071042 A1 | 6/2002 | Enomoto | |
| 2004/0189829 A1 | 9/2004 | Fukuda et al. | |
| 2006/0002590 A1 * | 1/2006 | Borak | 382/104 |
| 2008/0174680 A1 * | 7/2008 | Ogino | 348/231.99 |

FOREIGN PATENT DOCUMENTS

| | | |
|---|---|---|
| EP | 1 363 447 A2 | 11/2003 |
| EP | 1 503 581 A2 | 2/2005 |
| TW | 451103 | 8/2001 |

OTHER PUBLICATIONS

International Search Report and Written Opinion issued in corresponding international application No. PCT/IB2008/052724, mailed Dec. 22, 2008, 17 pages.

* cited by examiner

Primary Examiner — Clayton E Laballe
Assistant Examiner — Minh Q Phan
(74) Attorney, Agent, or Firm — Snyder, Clark, Lesch & Chung, LLP (57) ABSTRACT

A device may receive a background image, capture the background image, receive a subject image, modify the background image, superimpose the modified background image on the subject image to obtain a composite image, display the composite image, and capture the subject image.

17 Claims, 8 Drawing Sheets

Fig. 8B (top right) / Fig. 8D

USING A CAPTURED BACKGROUND IMAGE FOR TAKING A PHOTOGRAPH

BACKGROUND

Many of today's cameras have the ability to aid a photographer in focusing, white balancing, and/or adjusting shutter speed. For focusing, a camera may use ultrasound or infrared sensors to measure the distance between a subject and the camera. For white balancing, the camera may digitally modify a color component of a picture to improve its quality. For adjusting shutter speed, the camera may determine the optimal exposure of photoelectric sensors to light within the camera.

SUMMARY

According to one aspect, a device may include a lens assembly and a display to present a first image that is being received via the lens assembly. In addition, the device may include a processor to receive a second image via the lens assembly, transform the second image, superimpose the transformed second image on the first image that is being presented on the display, provide the superimposed images on the display, and capture the first image.

Additionally, the processor may be further configured to receive user input selecting the second image from a plurality of images.

Additionally, the transformed second image may include one of a faded version of the second image or a plurality of outlines extracted from the second image.

Additionally, the processor may be further configured to receive user input for selecting a transformation technique to transform the second image.

Additionally, the processor may be further configured to adjust a zoom associated with the lens assembly to match portions of the first image to portions of the second image.

Additionally, the processor may be further configured to automatically match portions of the first image to the transformed second image.

Additionally, the processor may be further configured to automatically capture the first image when the portions of the first image match or align with the transformed second image.

Additionally, the device may include a camera phone or a camera.

According to another aspect, a method may include receiving a background image, capturing the background image, receiving a subject image, modifying the background image, superimposing the modified background image on the subject image to obtain a composite image, displaying the composite image, and capturing the subject image.

Additionally, modifying the background image may include at least one of fading the background image or extracting features from the background image.

Additionally, the method may further include automatically obtaining a match between the modified background image and at least portions of the subject image.

Additionally, automatically obtaining a match may include at least one of modifying a zoom associated with capturing the subject image, translating the subject image, or rotating the subject image.

Additionally, automatically obtaining a match may further include determining an overall match of the background image to the subject image by calculating similarities between the background image and the subject image.

Additionally, determining the overall match may include extracting features from the subject image and comparing the extracted features to the modified background image.

Additionally, capturing the subject image may include automatically capturing the subject image when the match between the modified background image and the subject image meets a predefined level.

Additionally, automatically capturing the subject image may include automatically adjusting a focus, white balance, and shutter speed that are associated with capturing the subject image.

Additionally, capturing the subject image may include capturing the subject image in response to a user input for taking a photograph.

Additionally, the method may further include selecting the background image from a plurality of images.

Additionally, modifying the background image may be performed before capturing the background image.

According to yet another aspect, a device may include means for receiving one or more images through a lens assembly, means for fading each of the one or more images, means for storing the faded one or more images, means for selecting one of the faded one or more images as a background image, means for receiving a subject image through the lens assembly, means for overlaying the background image on the subject image, means for displaying the background image overlaid on the subject image, and means for capturing the subject image.

BRIEF DESCRIPTION OF THE DRAWINGS

The accompanying drawings, which are incorporated in and constitute a part of this specification, illustrate one or more embodiments described herein and, together with the description, explain the embodiments. In the drawings.

DETAILED DESCRIPTION OF EMBODIMENTS

The following detailed description refers to the accompanying drawings. The same reference numbers in different drawings may identify the same or similar elements.

The term "image," as used herein, may refer to a digital or an analog representation of visual information (e.g., a picture, a video, a photograph, animations, etc).

The term "camera," as used herein, may include a device that may capture images. For example, a digital camera may include an electronic device that may capture and store images electronically instead of using photographic film. A digital camera may be a multifunctional device, with some camera devices capable of recording sound and/or images.

A "subject," as the term is used herein, is to be broadly interpreted to include any person, place, and/or thing capable of being captured as an image. The term "subject image" may refer to an image of a subject.

In implementations described herein, a device (e.g., a camera) may present a captured background image to a user to help the user in taking pictures. When a user chooses to take a "background shot," the device may capture an image as a "background image."

The background image may be used in different ways. In one example, after taking a background shot of a scene, the user may pass the device to a person (e.g., a friend, a passerby, etc.) and ask the person to take a picture of the user in the scene. The person and/or device may cause the background image, which has been captured earlier, to be superimposed on a subject image that is being received through lens assembly of the device. The person may use the superimposed background image as a guide to capture the subject image that is being received through the lens assembly.

Figure 1A:
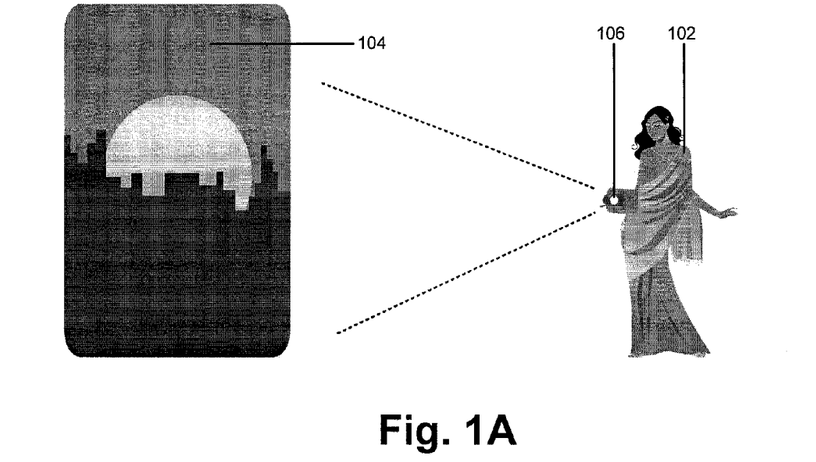
FIG. 1A shows a user capturing a background image with an exemplary device in which concepts described herein may be implemented.
Figure 1B:
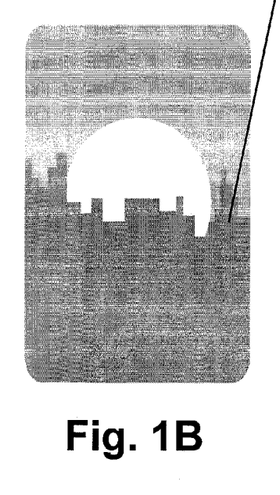
FIG. 1B shows a viewfinder/display of FIG. 1A after the background image is captured.

FIGS. 1A through 1D illustrate the above-described example. Assume that, in the example, Sonya 102, e.g., a user, wishes take a picture of a scene 104 with herself in scene 104. Sonya 102 may capture scene 104 as a background image. FIG. 1B illustrates the background image 108, which is a faded or lighter version of scene 104.

Figure 1C:
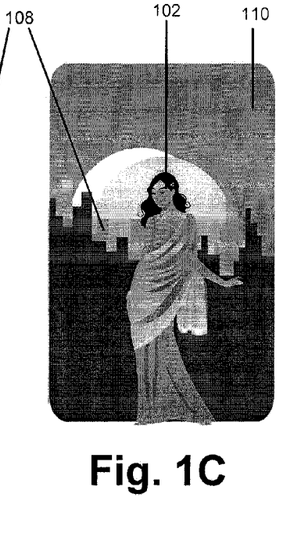
FIG. 1C shows the viewfinder/display of FIG. 1A when the background image is being used to capture a subject image.
Figure 1D:
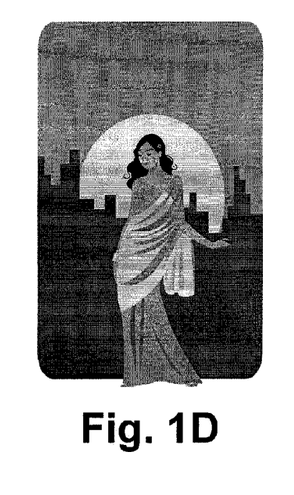
FIG. 1D shows the image of FIG. 1C after the subject image has been captured.

To obtain an image with herself in scene 104, Sonya 102 may request a passerby to take a picture of Sonya 102 with device 106 when Sonya 102 moves into scene 104. FIG. 1C illustrates the image that the passerby may see in the viewfinder/display of device 106. As illustrated in FIG. 1C, the passerby may see background 110, Sonya 102, and faded background image 108 that is superimposed on the subject image or displayed with the subject image that is being received by device 106. When faded background image 108 matches background 110, the passerby may take a picture, and capture an image of Sonya 102 and background 110. FIG. 1D shows the image that is captured by device 106.

In another example, assume that a user encounters a scene that the user wishes to capture. Also, assume that the scene is under unfavorable lighting conditions. The user may capture a background image, and return to the scene when the lighting conditions improve. Upon her return, the user may use the background image as a guide to capture an image of the scene under improved lighting conditions.

Exemplary Device

Figures 2A, 2B:
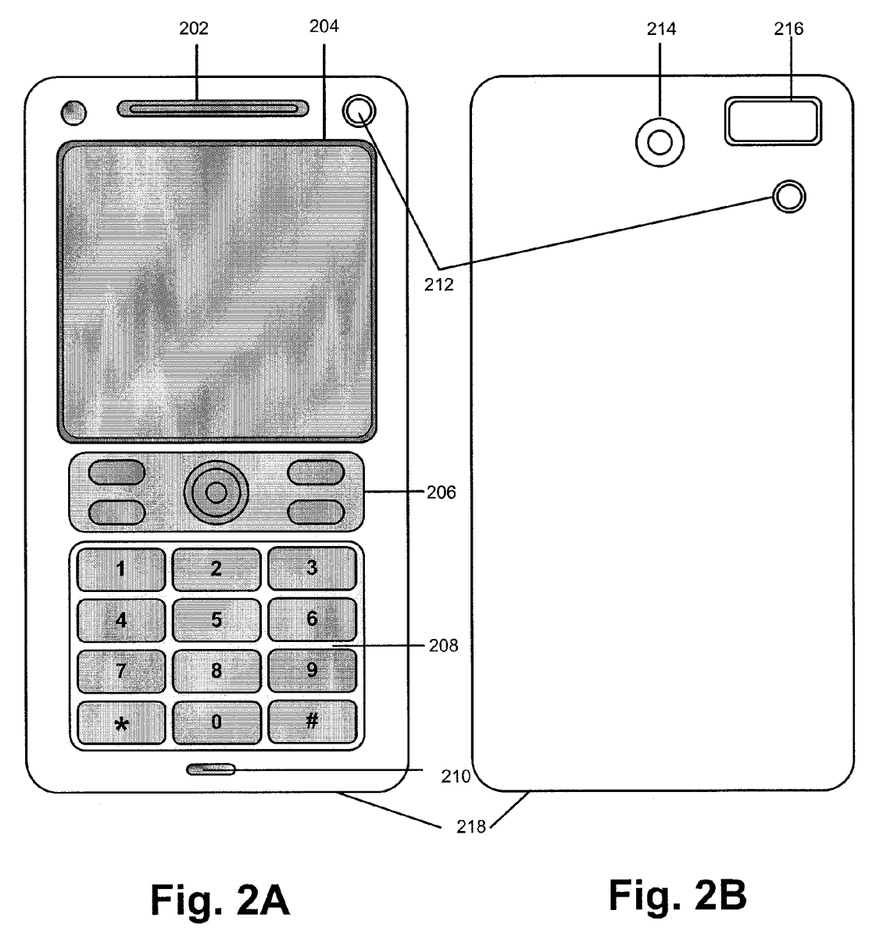
FIGS. 2A and 2B are block diagrams of the exemplary device in which the concepts described herein may be implemented.

FIGS. 2A and 2B are front and rear views, respectively, of an exemplary device 200 in which concepts described herein may be implemented. In this implementation, device 200 may include any of the following devices that have the ability to or are adapted to capture or process images (e.g., a video clip, a photograph, etc): a camera, a telephone, such as a radio telephone or a mobile telephone; a personal communications system (PCS) terminal that may combine a cellular radiotelephone with, data processing, facsimile, and/or data communications capabilities; an electronic notepad; a laptop; a personal computer (PC); a personal digital assistant (PDA) that can include a telephone; or another type of computational or communication device with the ability to process images.

As shown, device 200 may include a speaker 202, a display 204, control buttons 206, a keypad 208, a microphone 210, sensors 212, a lens assembly 214, a flash 216, and housing 218. Speaker 202 may provide audible information to a user of device 200. Display 204 may provide visual information to the user, such as video images or pictures. Control buttons 206 may permit the user to interact with device 200 to cause device 200 to perform one or more operations, such as placing or receiving a telephone call.

Keypad 208 may include a standard telephone keypad. Microphone 210 may receive audible information from the user. Sensors 212 may collect and provide, to device 200, information (e.g., acoustic, infrared, etc.) that is used to aid the user in capturing images. Lens assembly 214 may include a device for manipulating light rays from a given or a selected range, so that images in the range can be captured in a desired manner. Flash 216 may include any type of flash unit used in cameras and may provide illumination for taking pictures. Housing 218 may provide a casing for components of device 200 and may protect the components from outside elements.

Figure 3:
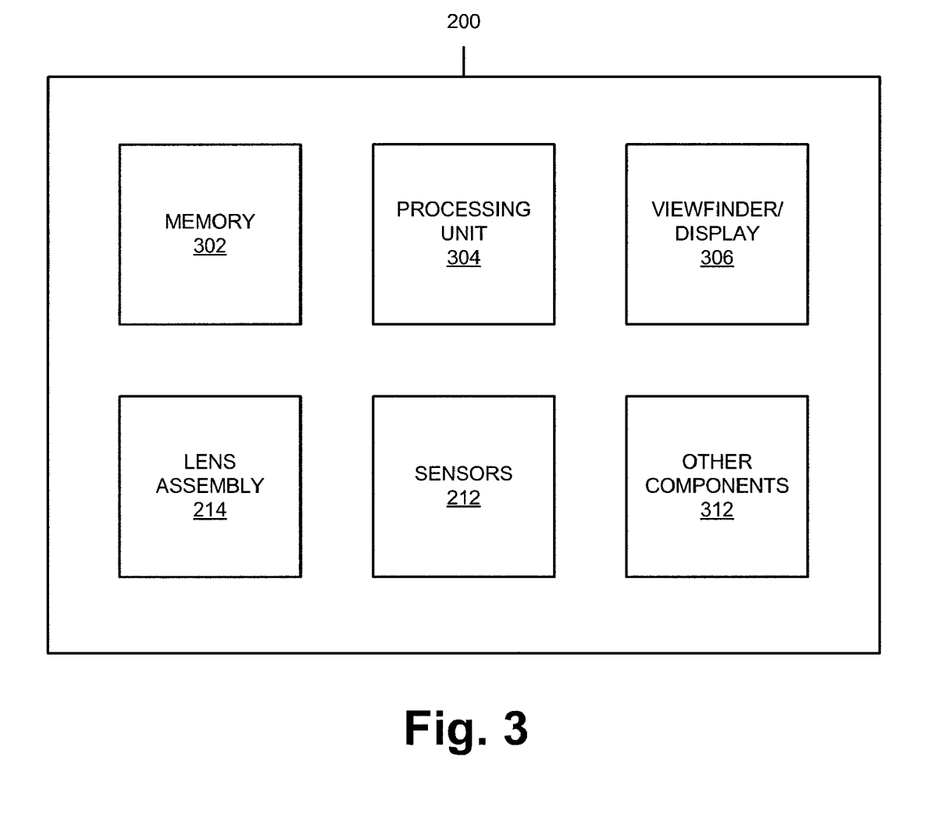
FIG. 3 is a block diagram of the exemplary components of the exemplary device of FIG. 2.

FIG. 3 is a block diagram of exemplary components of device 200. The term "component," as used herein, may refer to hardware component, a software component, or a combination of the two. As shown, device 200 may include memory 302, processing unit 304, viewfinder/display 306, lens assembly 214, sensors 212, and other components 312. In other implementations, device 200 may include more, fewer, or different components.

Memory 302 may include static memory, such as read only memory (ROM), and/or dynamic memory, such as random access memory (RAM), or onboard cache, for storing data and machine-readable instructions. Memory 302 may also include storage devices, such as a floppy disk, CD ROM, CD read/write (R/W) disc, and/or flash memory, as well as other types of storage devices. Processing unit 304 may include a processor, a microprocessor, an Application Specific Integrated Circuit (ASIC), a Field Programmable Gate Array (FPGA), and/or other processing logic capable of controlling device 200.

Viewfinder/display 306 may include a component that can display signals generated by device 200 as images on a screen (e.g., display 204) and/or that can accept inputs in the form of taps or touches on the screen. For example, viewfinder/display 306 may provide a window through which the user may view images that are received from lens assembly 214. Examples of viewfinder/display 306 include an optical viewfinder (e.g., a reversed telescope), liquid crystal display (LCD), organic light-emitting diode (OLED) display, surface-conduction electron-emitter display (SED), plasma display, field emission display (FED), bistable display, and/or a touch screen display.

Lens assembly 214 may include a component for manipulating light rays from a given or a selected range, so that images in the range can be captured in a desired manner. Lens assembly 214 may be controlled manually and/or electromechanically by processing unit 304 to obtain the correct focus, span, and magnification (i.e., zoom) of the subject image and to provide a proper exposure. Sensors 212 may include one or more components for obtaining information related to image, luminance, focus, and/or zoom. Sensors 212 may provide the information to processing unit 304, so that processing unit 304 may control lens assembly 214 and/or other components. Other components 312 may include phone-related components and/or input/output components, for converting physical events or phenomena to and/or from digital signals that pertain to device 200. Examples of such components may include phone-related hardware/software, a flash, button, mouse, speaker, microphone, Universal Serial Bus (USB) port, etc.

In some implementations, device 200 may include a network interface. In such implementations, the network interface may include any transceiver-like mechanism that enables device 200 to communicate with other devices and/or systems. For example, the network interface may include mechanisms for communicating via a network, such as the Internet, a terrestrial wireless network (e.g., wireless local area network (WLAN)), a satellite-based network, etc. Additionally or alternatively, the network interface may include a modem, an Ethernet interface to a local area network (LAN), and/or an interface/connection for connecting device 200 to other devices (e.g., a Bluetooth interface).

Figure 4:
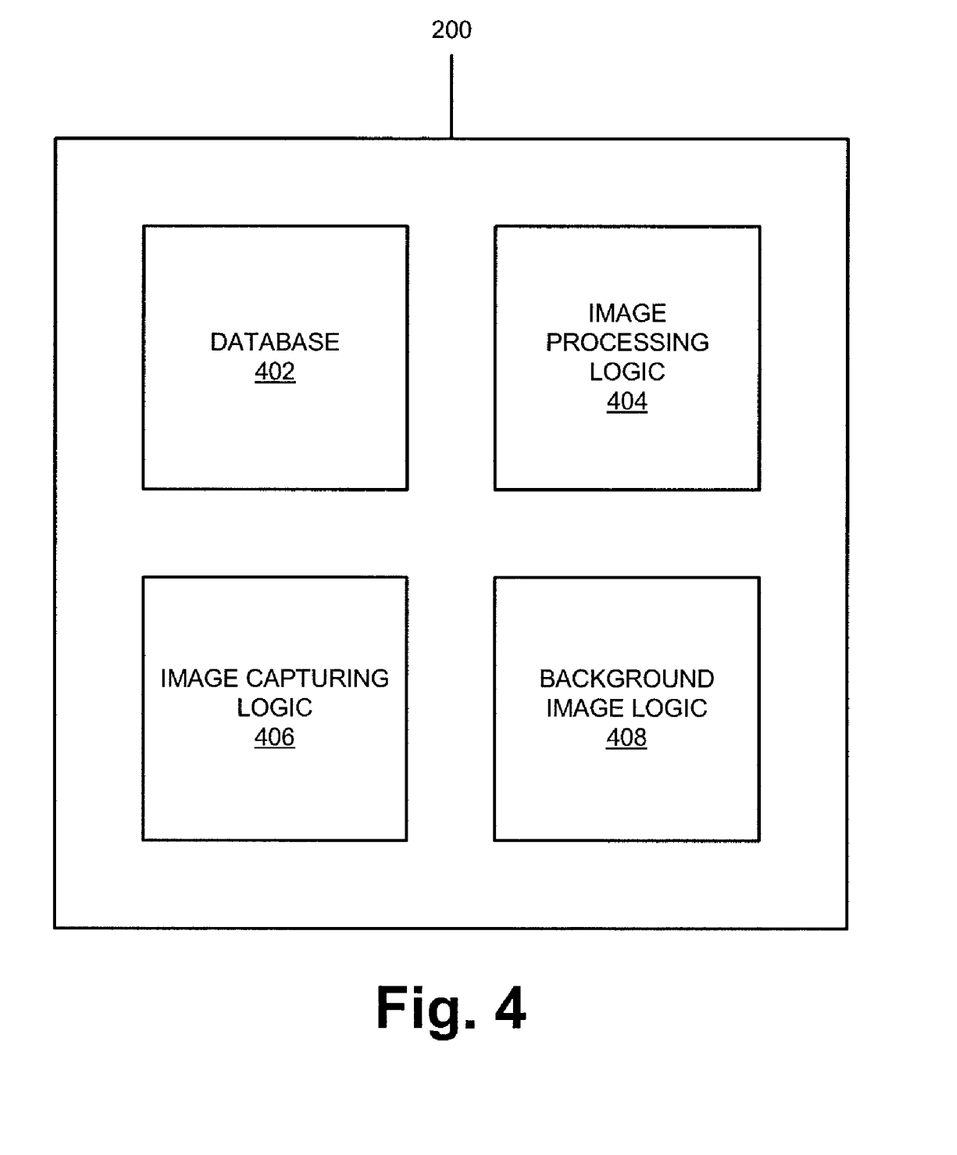
FIG. 4 is a functional block diagram of the exemplary device of FIG. 3.

FIG. 4 is a functional block diagram of device 200. As shown, device 200 may include a database 402, image processing logic 404, image capturing logic 406, and background image logic 406. Depending on the particular implementation, device 200 may include fewer, additional, or different types of functional blocks than those illustrated in FIG. 4.

Database 402 may be included in memory 302 (FIG. 3) and act as an information repository for the components of device 200. For example, in one implementation, database 402 may include images (e.g., pictures, video clips, etc.) that may be stored and/or accessed by image processing logic 404 and/or background image logic 406. In another example, database 402 may include audio files (e.g., audio clips, ring tones, etc.).

Image processing logic 404 may include hardware and/or software for processing images before/after the images are captured. For example, image processing logic 404 may apply a filter for noise-reduction to improve the quality of images before/after the images are captured by device 200. In another example, image processing logic 404 may apply an anti-aliasing procedure to captured images.

Image capturing logic 406 may include hardware and/or software for capturing images. Image capturing logic 406 may adjust zoom (e.g., magnification), focus, shutter speed, and exposure of film by controlling lens assembly 214 based on the outputs from sensors 212 and/or user inputs. In many implementations, image capturing logic 406 may provide automatic white balancing or other types of post-capture image processing.

Background image logic 408 may include hardware and/or software for manipulating background images. More specifically, background image logic 408 may receive an image from image capturing logic 406, fade out the received image, and store the faded image as a background image. When another component in device 200 requests the background image, background image logic 408 may retrieve the stored background image.

In some configurations, background image logic 408 may transform the retrieved image, and superimpose the transformed image (e.g., faded image) over a subject image that is being received through lens assembly 214. Presented with the superimposed images on viewfinder/display 306, a user may manipulate device 200 until the superimposed images merge, or the user wishes to capture the subject image. In some implementations, when a user takes a picture, only the subject image is captured (i.e., the transformed image that is superimposed over the new image is not captured). In other implementations, the background image may be used with the captured image.

In some implementations, background image logic 408 may automatically perform a match between the background image and the subject image. The match may be performed by adjusting focus, magnification (e.g., zoom), translation, and/or rotation of the received image relative to the background image and calculating the difference between the images (e.g., in terms of intensity, color, etc.). In one implementation, device 200 may automatically capture the subject image when the differences between the images are minimized (e.g., the degree of match between the image meets a threshold value).

Exemplary Process for Using a Background Image

Figure 5:
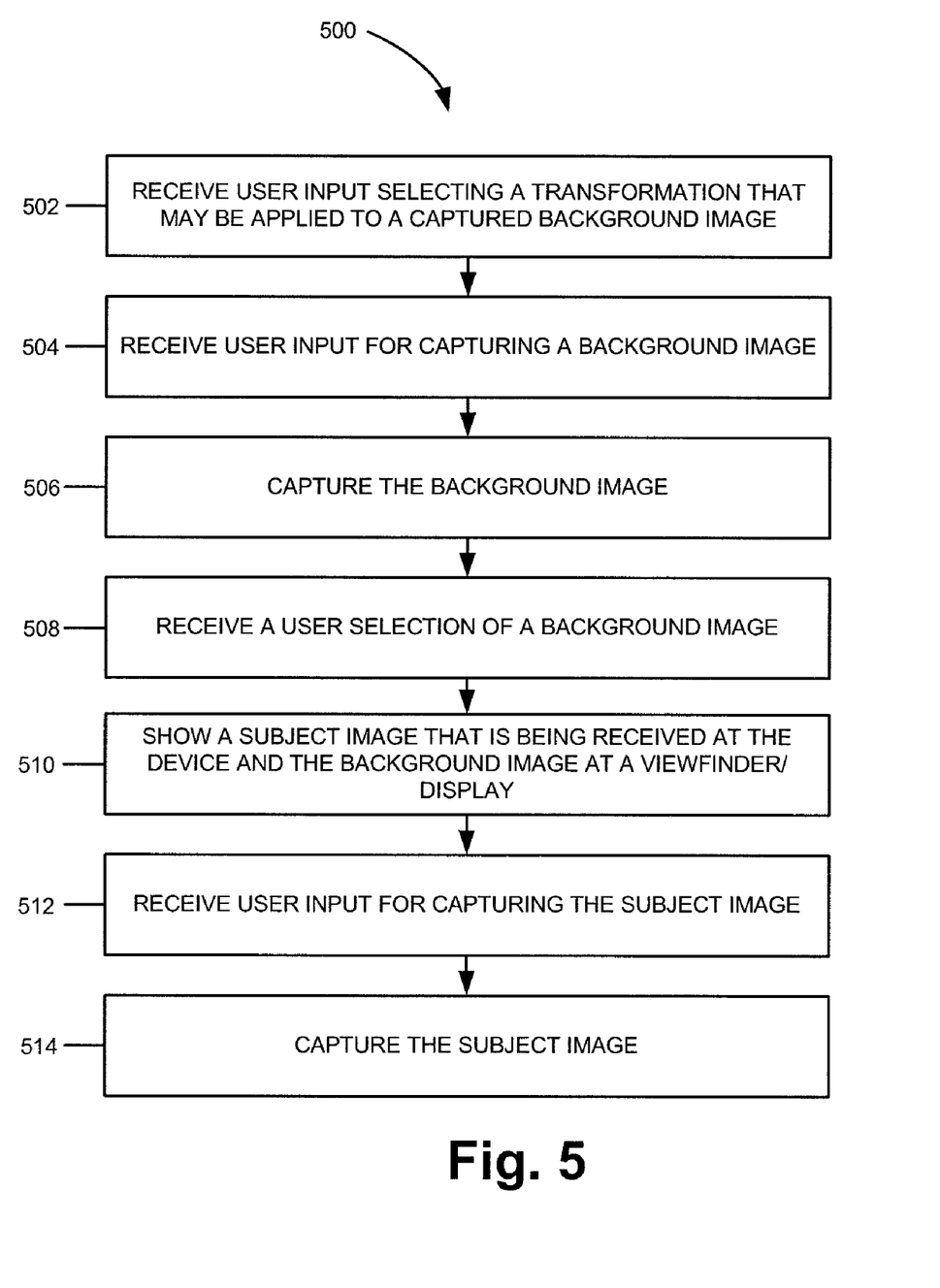
FIG. 5 is a flow chart of a process for using a background image.

FIG. 5 is a flowchart 500 of a process for using a background image. Process 500 may start at block 502, where device 200 may accept user input for selecting a transformation technique that may be applied to a captured background image (block 502). The user may select from a number of transformation techniques, which may include fading (e.g., substituting a color with a lighter color), line extraction, and/or a combination of different image processing techniques. For example, one transformation technique may involve sharpening an image and then fading the sharpened image.

The transformation technique may be selected via a menu system that is shown on viewfinder/display 306. If a user does not select a transformation technique, a default transformation technique may be automatically selected or provided by device 200.

User input for capturing a background image may be received (block 504). The user input may be provided via control buttons 206 (FIG. 2) or a standard button for capturing an image on a camera.

The background image may be captured (block 506). In one implementation, the captured image may be tagged with a specific flag that indicates the captured image is a background image. Designating the image as a background image may be accomplished via a menu provided, for example, on viewfinder/display 306. In a different implementation, the background image may be captured as an ordinary image. In still another implementation, the selected transformation technique may be applied to the captured image before the image is stored as a background image.

A user selection of a background image may be received (block 508). In one implementation, when the user captures an image, the captured image may be automatically selected as a background image to be used as an aid in capturing another image. In another implementation, a captured image may carry a tag that identifies the location at which the image was captured. In such a case, the background image may be automatically selected based on a user location that may be obtained, via, for example, Global Positioning System (GPS) receiver in device 200. In yet another implementation, the user may select a specific background image from a collection of images that the user may view via a menu system on viewfinder/display 306. In still another implementation, the last background image that was used may be automatically selected. The user may then focus on a subject image via viewfinder/display 306.

The subject image and the selected background image may be shown together via viewfinder/display 306 (block 510). The background image that is shown on viewfinder/display 306 may depend on the specific transformation technique that is selected at block 502.

For example, if the specific transformation technique involves fading, a faded background image may be superimposed on the subject image that is being received via lens assembly 214. The faded background image and the subject image may be shown together on viewfinder/display 306, such as in the example illustrated in FIG. 1C. In another example, the specific transformation technique may involve extracting lines from the background image. The lines may be superimposed on the subject image that is being received via lens assembly 214.

Figure 6:
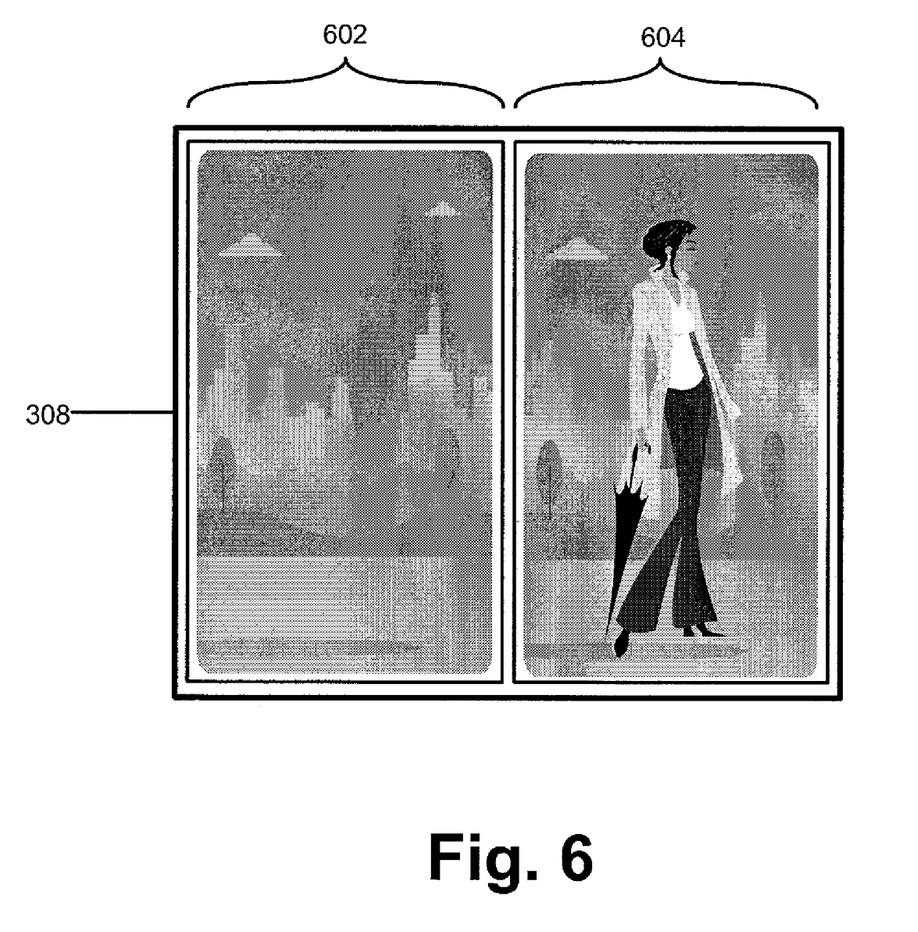
FIG. 6 shows the viewfinder/display of the exemplary device of FIG. 3 when the viewfinder/display shows a background image and a subject image.

In yet another example, the transformation technique may involve no special processing or operation and may simply preserve the captured background image. In such a case, the captured background image may be shown alongside the subject image on viewfinder/display 306 of device 200. FIG. 6 illustrates viewfinder/display 306 that shows a background image 602 and a subject image 604 at the same time.

In the above examples that involve a transformation technique that is selected at block 502, the transformation technique may be applied to the background image before the background image is superimposed on the subject image. In implementations where the background image is transformed prior to its capture, however, it may not be necessary to apply a transformation technique to the background image just before the background image is superimposed on the subject image.

User input for capturing the subject image may be received (block 512). For example, the user may input the command for capturing the image when the user "matches" the background image and the background of the received image (i.e., the currently received image).

In some implementations, device 200 may automatically match the background image and the subject image. The match may involve various image processing techniques. For example, in one implementation, device 200 may adjust the zoom of device 200 or magnification of the subject image, translate and/or rotate the background image relative to the subject image, superimpose the background image on the subject image, and calculate the overall match by determining the differences between the background image and the subject image based on parameters, such as size, color, shading, intensity, etc. Device 200 may perform various adjustments (e.g., changing the zoom) until the best match is obtained. In another example, device 200 may extract features (e.g., lines) from the subject image and compare the extracted features to features that are already extracted from the background image.

The subject image may be captured (block 514). In implementations in which device 200 automatically matches the background image and the received image, device 200 may or may not automatically capture the received image when the best match (e.g., when the match is at the maximum) is obtained. If the subject image is automatically captured, no manual input from the user may be required to capture the received image. In other instances, viewfinder/display 306 may visually indicate a match and the user may press a shutter button in response to the indication.

Alternative Implementation

Figure 7A:
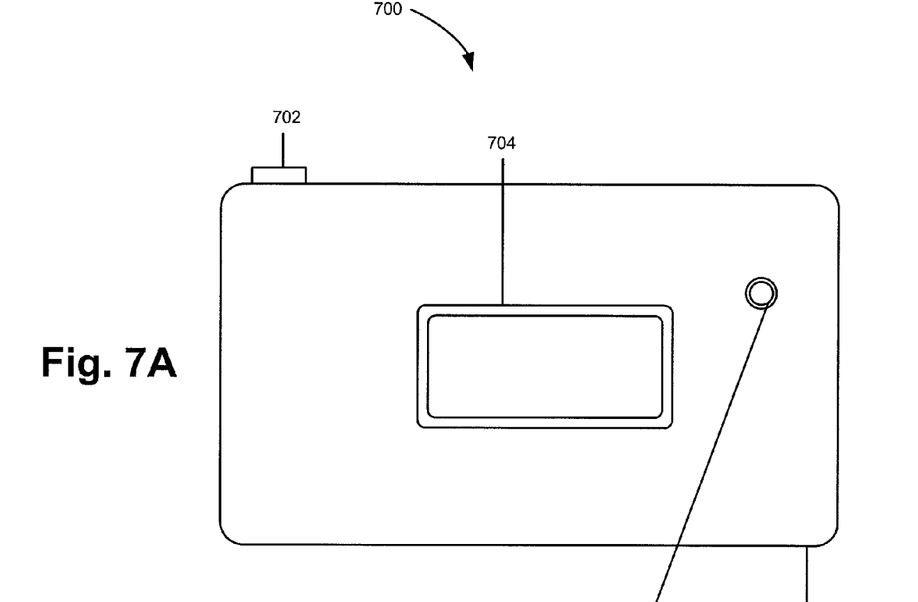
FIGS. 7A and 7B are front and rear views, respectively, of another exemplary device in which concepts described herein may be implemented.
Figure 7B:
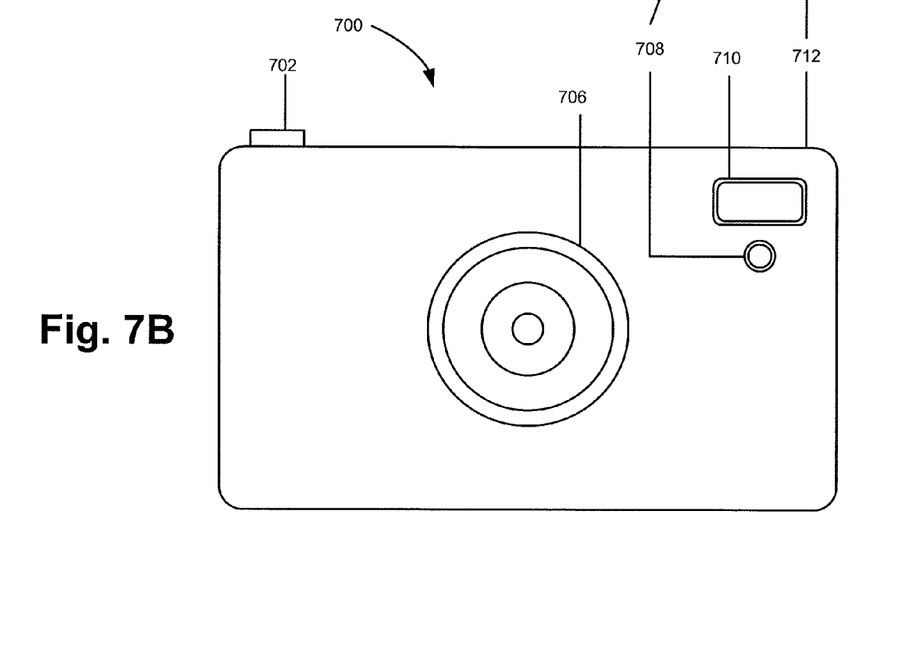

FIGS. 7A and 7B are front and rear views, respectively, of another exemplary device in which concepts described herein may be implemented. As shown, device 700 may be a camera device that may or may not include other communication related functionality. Device 700 may include a button 702, a viewfinder/display 704, a lens assembly 706, sensors 708, a flash 710, and housing 712. Button 702 may permit the user to interact with device 700 to cause device 700 to perform one or more operations, such as taking a picture. Viewfinder/display 704 may provide visual information to the user, such as an image of a view, video images, pictures, etc. Lens assembly 706 may include a device for manipulating light rays from a given or a selected range, so that images in the range can be captured in a desired manner. Sensors 708 may collect and provide, to device 700, information (e.g., acoustic, infrared, etc.) that may be used to aid the user in capturing images. For example, sensors 708 may provide acoustic information that may be used for automatically focusing an image. Flash 710 may include any type of flash unit used in cameras and may provide illumination for taking pictures. Housing 712 may provide a casing for components of device 700 and may protect the components from outside elements. Device 700 may include similar components as device 200 discussed above with respect to FIG. 3.

EXAMPLE

The following example illustrates processes involved in using a background image to capture a subject image, with reference to FIG. 8A through 8D. The example is consistent with exemplary process 500 described above with respect to FIG. 5.

Figure 8A:
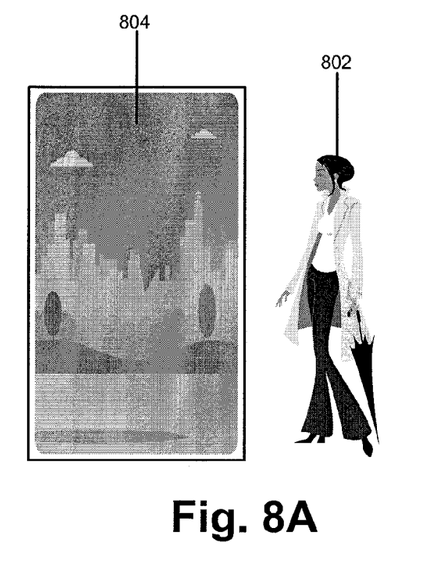
FIGS. 8A through 8D illustrate using a background image to capture a subject image.
Figure 8B:
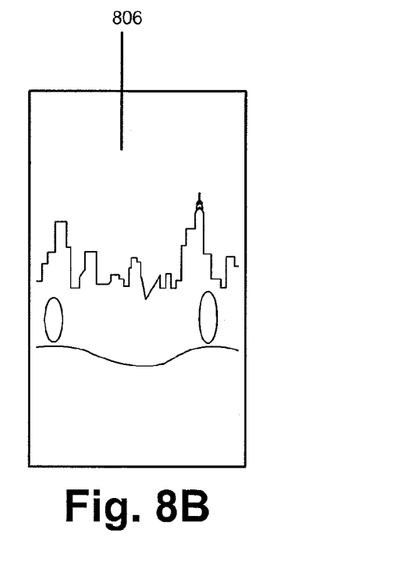

In FIG. 8A, assume that Maria 802 wants to take a picture of herself in a scene. Also, assume that Maria 802 selects a transformation that extracts lines from a captured image. Maria 802 sees a scene 804 in a viewfinder of device 200/700, and captures an image of scene 804. Device 200/700 automatically applies the selected transformation to the image to obtain a background image. FIG. 8B illustrates the background image 806 that is obtained by applying the transformation.

Figure 8C:
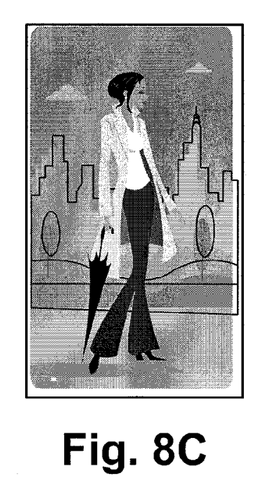
Figure 8D:
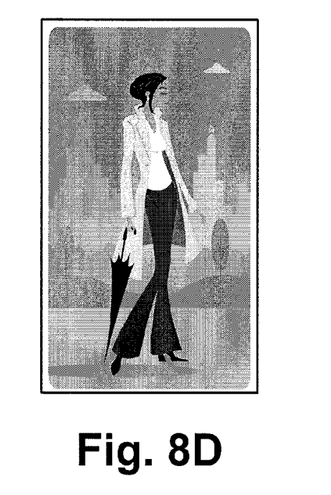

Maria 802 asks a passerby to take a shot of scene 804 with herself in scene 804. The passerby agrees and looks at the viewfinder of device 200/700. FIG. 8C shows the viewfinder of device 200/700 with Maria 802 in scene 804 and with background image 806 superimposed on scene 804. When background image 806 and scene 804 in the viewfinder match, the passerby takes a shot of Maria 802 and scene 804. FIG. 8D shows the image that is captured by the passerby.

CONCLUSION

The foregoing description of implementations provides illustration, but is not intended to be exhaustive or to limit the implementations to the precise form disclosed. Modifications and variations are possible in light of the above teachings or may be acquired from practice of the teachings.

For example, while a series of blocks has been described with regard to an exemplary process illustrated in FIG. 5, the order of the blocks may be modified in other implementations. In addition, non-dependent blocks may represent acts that can be performed in parallel to other blocks.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

It should be emphasized that the term "comprises/comprising" when used in this specification is taken to specify the presence of stated features, integers, steps or components but does not preclude the presence or addition of one or more other features, integers, steps, components, or groups thereof.

Further, certain portions of the implementations have been described as "logic" that performs one or more functions.

This logic may include hardware, such as a processor, a microprocessor, an application specific integrated circuit, or a field programmable gate array, software, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the implementations described herein unless explicitly described as such. Also, as used herein, the article "a" is intended to include one or more items. Where one item is intended, the term "one" or similar language is used. Further, the phrase "based on" is intended to mean "based, at least in part, on" unless explicitly stated otherwise.

What is claimed is:

1. A device comprising:
   a lens assembly;
   a display to present a first image that is being received via the lens assembly; and
   a processor to:
      capture a plurality of second images via the lens assembly;
      associate tags with, respectively, the captured plurality of second images, the tags designating the captured plurality of second images as background images and identifying respective locations at which the plurality of second images were captured;
      transform the plurality of second images;
      store each of the plurality of second transformed images and the associated tag in a memory;
      determine a current location of the device;
      automatically select a transformed second image, of the transformed plurality of second images, from the memory based on the determined current location of the device and the tag associated with the selected transformed second image;
      provide the selected transformed second image and the first image on a same area of the display; and
      forming a third image using the first image and the selected transformed second image.

2. The device of claim 1, where each of the transformed plurality of second images includes one of:
   a faded version of the one of the plurality of second images; or
   a plurality of outlines extracted from the one of the plurality of second images.

3. The device of claim 1, where the processor is further to:
   receive user input for selecting a transformation technique to transform the plurality of second images.

4. The device of claim 1, where the processor is further to:
   automatically adjust a zoom associated with the lens assembly to cause portions of the first image to match portions of the selected transformed second image.

5. The device of claim 1, where the processor is further to:
   automatically cause portions of the first image to match portions of the selected transformed second image.

6. The device of claim 5, where the processor is further to:
   automatically capture the first image when the portions of the first image match or align with the selected transformed second image.

7. The device of claim 1, where the device comprises:
   a camera phone; or
   a camera.

8. A method performed by a device, the method comprising:
   receiving a plurality of background images via a lens assembly of the device;
   capturing the plurality of background images;
   modifying the plurality of background images;
   determining locations at which the device captures, respectively, the plurality of background images;
   associating tags with the plurality of background images, the tags identifying the locations associated with, the plurality of background images;
   storing the modified plurality of background images and the associated tags in a memory;
   automatically selecting a modified background image, of the plurality of the modified background images, based on a current location of the device and the tag associated with the selected modified background image;
   receiving a subject image;
   displaying the selected modified background image and the subject image on a same area of a display; and
   capturing the subject image using the selected modified background image.

9. The method of claim 8, where modifying the plurality of background images includes at least one of:
   fading the plurality of background images; or
   extracting features from the plurality of background images.

10. The method of claim 8, further comprising:
    automatically obtaining a match between the selected modified background image and at least portions of the subject image.

11. The method of claim 10, where automatically obtaining a match includes at least one of:
    modifying a zoom associated with capturing the subject image;
    translating the subject image; or
    rotating the subject image.

12. The method of claim 11, where automatically obtaining a match further includes:
    determining an overall match of the selected modified background image to the subject image by calculating similarities between the selected modified background image and the subject image.

13. The method of claim 12, where determining the overall match includes:
    extracting features from the subject image; and
    comparing the extracted features to the selected modified background image.

14. The method of claim 11, where capturing the subject image includes:
    automatically capturing the subject image when the match between the selected modified background image and the subject image meets a predefined level.

15. The method of claim 14, where automatically capturing the subject image includes:
    automatically adjusting a focus, white balance, and shutter speed that are associated with capturing the subject image.

16. The method of claim 8, where capturing the subject image includes:
    capturing the subject image in response to a user input for taking a photograph.

17. A mobile communications device comprising:
    means for capturing images through a lens assembly;
    means for fading each of the images;

means for storing the faded images along with tags identifying locations, respectively, of the device when the images were captured;

means for receiving a subject image through the lens assembly;

means for determining a location associated with the subject image;

means for selecting one of the faded images as a background image based on a current location of the device and the tags;

means for displaying the background image and the subject image on a same area of a display;

means for automatically obtaining a match between the displayed background image and at least portions of the displayed subject image, the means for automatically obtaining the match including means for determining an overall match of the selected background image to the subject image by calculating similarities between the selected background image and the subject image; and means for capturing the subject image.

* * * * *

UNITED STATES PATENT AND TRADEMARK OFFICE
CERTIFICATE OF CORRECTION

PATENT NO.       : 7,991,285 B2
APPLICATION NO.  : 11/970617
DATED            : August 2, 2011
INVENTOR(S)      : Kally Shi Yi Tan It is certified that error appears in the above-identified patent and that said Letters Patent is hereby corrected as shown below:

Column 10, lines 3 and 4, remove text "via a lens assembly of the device"

Signed and Sealed this
Eighth Day of November, 2011

David J. Kappos
*Director of the United States Patent and Trademark Office*